US010730422B2

(12) United States Patent
Oswald et al.

(10) Patent No.: US 10,730,422 B2
(45) Date of Patent: Aug. 4, 2020

(54) BACKREST SPEAKERS WITH ACOUSTIC CHANNELS

(71) Applicant: Bose Corporation, Framingham, MA (US)

(72) Inventors: Charles Oswald, Salem, NY (US); Bradford Kyle Subat, Worcester, MA (US); Tobe Z. Barksdale, Bolton, MA (US); Muhammad Haris Usmani, Esslingen am Neckar (DE)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/795,569

(22) Filed: Oct. 27, 2017

(65) Prior Publication Data

US 2018/0118063 A1    May 3, 2018

Related U.S. Application Data

(60) Provisional application No. 62/414,438, filed on Oct. 28, 2016.

(51) Int. Cl.
*H04R 5/02* (2006.01)
*B60N 2/879* (2018.01)
(Continued)

(52) U.S. Cl.
CPC .......... *B60N 2/879* (2018.02); *B60R 11/0217* (2013.01); *B64D 11/00154* (2014.12);
(Continued)

(58) Field of Classification Search
CPC .... H04S 1/00; H04R 1/02; H04R 1/26; H04R 5/02; H04R 2499/13; B60R 11/02;
(Continued)

(56) References Cited

U.S. PATENT DOCUMENTS 2,908,766 A * 10/1959 Taylor ................. H04B 5/00
                                              181/145
3,792,754 A *  2/1974 Hanson ............. H04R 5/0335
                                              181/130
(Continued)

FOREIGN PATENT DOCUMENTS

| JP | 2007221485 A | * | 8/2007 |
| JP | 2008 173998 |   | 7/2008 |
| JP | 2008173998 A | * | 7/2008 |

OTHER PUBLICATIONS

International Search Report and Written Opinion; PCT/US2017/058186; dated Feb. 23, 2018.

*Primary Examiner* — Leshui Zhang
(74) *Attorney, Agent, or Firm* — Fish & Richardson P.C.

(57) ABSTRACT

The technology described in this document can be embodied in a vehicle seat that includes a seat headrest portion for supporting the head of an occupant, and a seat backrest portion for supporting the back of the occupant in a seated position. The backrest portion includes an enclosure for receiving at least a portion of an acoustic transducer. The vehicle seat also includes an acoustic channel having a first end that is configured to be fitted around a driver of the acoustic transducer in an acoustically sealed configuration, and a second end. The second end is opposite the first end and disposed at a location closer to the seat headrest portion than the seat backrest portion. The acoustic channel is configured to radiate acoustic energy from the acoustic transducer through the second end.

27 Claims, 7 Drawing Sheets

(51) Int. Cl.
*B64D 11/00* (2006.01)
*B60R 11/02* (2006.01)
*B60R 11/00* (2006.01)

(52) U.S. Cl.
CPC ............... *B60R 2011/0012* (2013.01); *B60R 2011/0015* (2013.01)

(58) Field of Classification Search
CPC ......... B60R 11/0217; B60R 2011/0012; B60R 2011/0015; B60R 2011/0017; B60N 3/00; B60N 2/44; B60N 2/64; B60N 2/663; B60N 2/80; B60N 2/879; A47C 7/72; B64D 11/00154; B64D 11/0015; B64D 11/00155; H04B 1/082; G10K 2210/1283; G10K 2210/12822; G10K 2210/12821; G10K 2210/1282; G10K 2210/1281; G10K 2210/128
USPC ................. 381/86, 302, 71.4, 365, 389, 340
See application file for complete search history.

(56) References Cited

U.S. PATENT DOCUMENTS

| | | | | |
|---|---|---|---|---|
| 4,210,784 | A * | 7/1980 | Phillips | H04R 1/02 381/301 |
| 4,868,888 | A * | 9/1989 | Dayton | H04R 5/023 455/575.1 |
| 8,913,777 | B2 | 12/2014 | Pelliccio et al. | |
| 2009/0295202 | A1* | 12/2009 | Takada | H04R 1/028 297/217.4 |
| 2011/0228959 | A1* | 9/2011 | Meehan | H04S 3/002 381/307 |
| 2012/0051579 | A1* | 3/2012 | Cohen | A61H 23/0236 381/388 |
| 2014/0219492 | A1 | 8/2014 | Pelliccio et al. | |
| 2015/0201260 | A1* | 7/2015 | Oswald | H04R 1/025 381/86 |

* cited by examiner

__US 10,730,422 B2__

BACKREST SPEAKERS WITH ACOUSTIC CHANNELS

CLAIM OF PRIORITY

This application claims priority to U.S. Provisional Application Ser. No. 62/414,438, filed on Oct. 28, 2016, the entire contents of which are hereby incorporated by reference.

TECHNICAL FIELD

This disclosure generally relates to seats that include acoustic output devices such as speakers.

BACKGROUND

Vehicle seats can include speakers disposed in a portion of the backrest. In some cases, the speakers are disposed near the location of shoulders of an occupant of the seat, and are referred to as shoulder speakers.

SUMMARY

In one aspect, this document features a vehicle seat that includes a seat headrest portion for supporting the head of an occupant, and a seat backrest portion for supporting the back of the occupant in a seated position. The backrest portion includes an enclosure for receiving at least a portion of an acoustic transducer. The vehicle seat also includes an acoustic channel having a first end that is configured to be fitted around a driver of the acoustic transducer in an acoustically sealed configuration, and a second end. The second end is opposite the first end and disposed at a location closer to the seat headrest portion than the seat backrest portion. The acoustic channel is configured to radiate acoustic energy from the acoustic transducer through the second end.

In another aspect, this document features a vehicle seat that includes a support structure configured to support the back of an occupant in a seated position, and an enclosure disposed within the support structure. The enclosure has an opening disposed on an exterior surface of the support structure, and is configured to receive at least a portion of an acoustic transducer. The vehicle seat also includes an acoustic channel having a first end configured to be fitted around the opening in an acoustically sealed configuration, and a second end being opposite the first end, and disposed at a vertically higher location compared to the first end. The acoustic channel is configured to radiate acoustic energy through the second end.

The above aspects can include one or more of the following features.

The seat headrest portion can be disposed on top of the seat backrest portion in a detachable configuration. The seat headrest portion and the seat backrest portion can be portions of an integrated structure. The seat backrest portion can include a top surface, and an external opening of the enclosure is disposed on the top surface. The acoustic transducer can be disposed within the enclosure in a configuration such that an external end of the driver of the acoustic transducer fits over the external opening of the enclosure. A portion of the acoustic transducer can be disposed outside the enclosure. A cross section of the second end of the acoustic channel is larger than a cross section of the first end. At least one of: i) a shape of the acoustic channel and ii) an articulation of the acoustic transducer can be configured in accordance with a target distribution pattern for the acoustic energy radiated by the acoustic transducer. The target distribution pattern can include one or more of: i) an inter-aural distribution characteristic, and ii) an inter-seat distribution characteristic. An outer layer of the vehicle seat can be disposed over the acoustic channel to enclose at least a portion of the acoustic channel and the seat backrest. An outer layer of the vehicle seat can be disposed over the acoustic channel to enclose at least a portion of the acoustic channel and the seat headrest. An acoustically transparent material can be disposed over the second end of the acoustic channel. The acoustically transparent material can include a portion of a speaker grill. The acoustic channel can have an adjustable length between the first end and the second end. One or more equalization parameters associated with one or more transducers may be dynamically updated in accordance with the adjustable length. The second end can be configured to be disposed around a ear of the user in a substantially sealing configuration.

The opening can be disposed on the exterior surface of the support structure at a location of the support structure that is adjacent to a shoulder of an occupant of the vehicle seat. The opening can be disposed on the exterior surface of the support structure such that the acoustic transducer disposed within the enclosure radiates acoustic energy towards an ear of an occupant of the vehicle seat.

Various implementations described herein may provide one or more of the following advantages. Acoustic performance of speakers disposed in a seat backrest (e.g., shoulder speakers) may be improved significantly by providing acoustic channels that radiate the output of such speakers near the ears of an occupant of the seat. In some cases, this can result in improved binaural control, inter-aural isolation, and/or inter-seat isolation. The mechanical advantages of integrating speakers within the backrest may therefore be leveraged while preserving, at least to some extent, the acoustic performance of near-field speakers such as speakers disposed in headrests. In some cases, high-performance seat speakers (having performance comparable to that of headrest speakers) may be integrated into backrests of seats that have thin and low-bulk headrests incapable of accommodating speakers therein. The acoustic channels themselves may in some cases be used to improve aesthetics of the seat, thereby potentially allowing for a better synchrony between the industrial design and the acoustic requirements. For example, the external openings of the acoustic channels may be positioned and configured to resemble an air-intake pathway of a sports car to provide a futuristic look to the vehicle seat.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Vehicle seats (e.g., seats used in cars, trucks, buses, trains, aircrafts, boats, or other vehicles) can be fitted with acoustic transducers or speakers for delivering a near-field acoustic experience. In some cases, speakers are fitted into seats such that the speakers are proximate to the ears of an occupant of the seat, to provide an immersive, and potentially personalized acoustic experience. Speakers can be integrated into a vehicle seat at various locations. In some cases, speakers are integrated within seat headrests or headrest wings. Such headrest speakers can provide excellent acoustic performance (e.g., in terms of providing binaural control and/or inter-seat isolation) by virtue of being close to the ears of the seat occupant. However, for some vehicle seats, headrest speakers may not be the best choice. For example, in some cases, headrest speakers may pose mechanical integration challenges because of having a high center of mass (and thereby possibly needing additional seat reinforcements). In addition, wiring headrest speakers through the headrest connectors may also be challenging for some vehicle seats. Also, some headrests are designed to be thin and low-bulk, and may not have enough volume to accommodate headrest speakers.

Figure 1C:
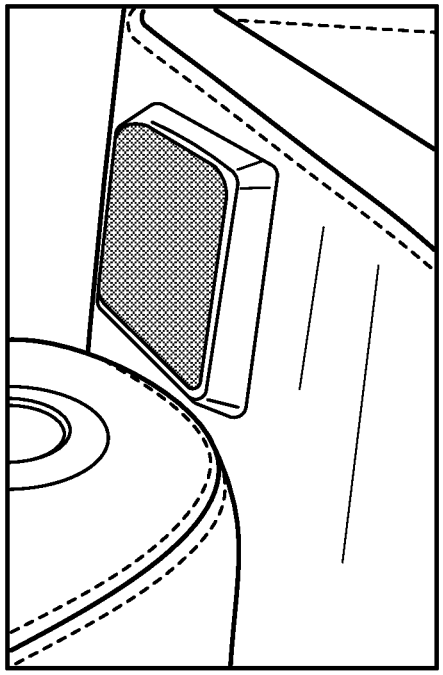
FIGS. 1A-1C show examples of shoulder speakers disposed in backrests of vehicle seats.
Figure 1B:
Figure 1A:
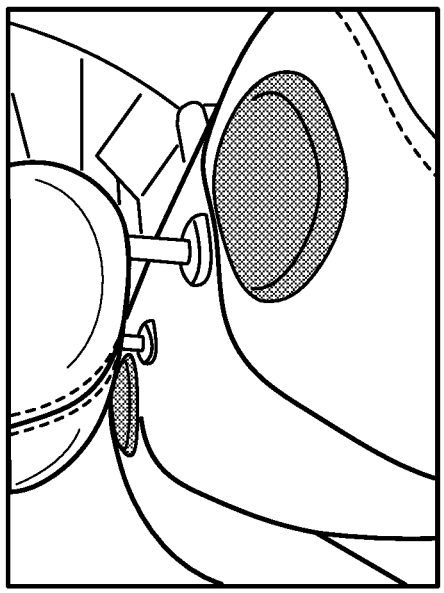

Seat speakers may also be integrated, at least in part, in a backrest of a vehicle seat. For example, shoulder speakers can be disposed on a top surface of a backrest and configured to radiate acoustic energy upwards towards the occupant's ears. Examples of such shoulder speakers are illustrated in FIGS. 1A-1C. As compared to headrest speakers, shoulder speakers are typically disposed further away from the occupant's ears and therefore may in some cases exhibit degraded performance, for example, in terms of inter-aural and inter-seat isolation. However, from an integration perspective, shoulder speakers may be preferred over headrest speakers in some cases, for example, because shoulder speakers have a lower center of mass than headrest speakers. Also, shoulder speakers may be easier to integrate into seats due to more available space in the seat backrest, and/or because unlike headrest speakers, the associated wiring does not need to be passed through the headrest posts.

The technology described in this document allows for leveraging the advantages of shoulder speakers while reducing the drawbacks associated with such speakers being relatively far-field. For example, by providing carefully designed acoustic channels that carry acoustic energy from far-field speakers (e.g., speakers disposed in seat backrests) to a region closer to the ears of the seat occupant, the technology combines the integration advantages of backrest speakers while producing an acoustic performance that may be at least comparable to headrest speakers. Therefore, in some cases, the technology may provide solutions that make integration of speakers into seats easier without any significant loss in acoustic performance of the speakers. This document primarily uses examples of vehicle seat headrests to illustrate the technology. However, the technology may be applicable to other types of acoustically enabled seats or furniture that may have speakers installed in the manner described herein. For example, the technology can be used in massage chairs, sofas, recliners, tables, gaming chairs, theater seats, or beds fitted with speakers.

Figure 2A:
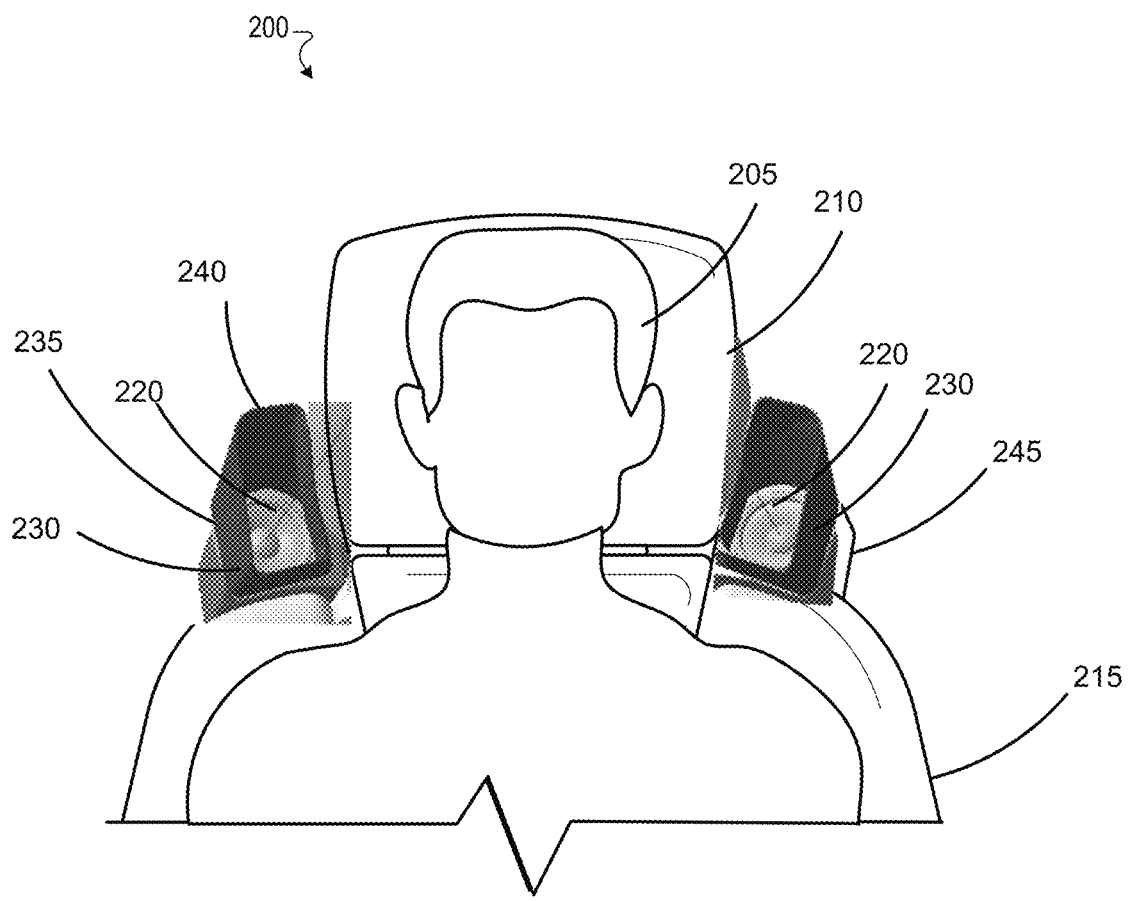
FIGS. 2A-2D show various views of an example implementation of backrest speakers with acoustic channels, where at least a portion of the speakers are disposed outside the backrest.
Figure 2B:
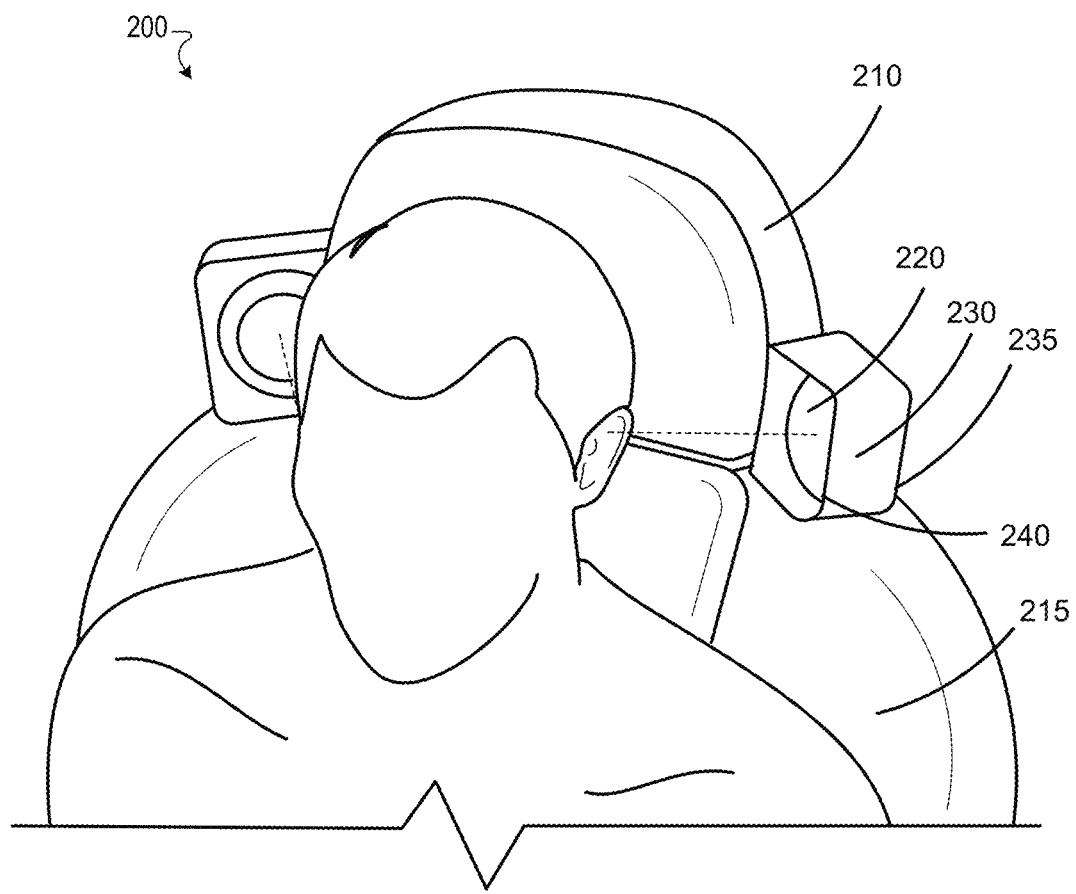
Figure 2C:
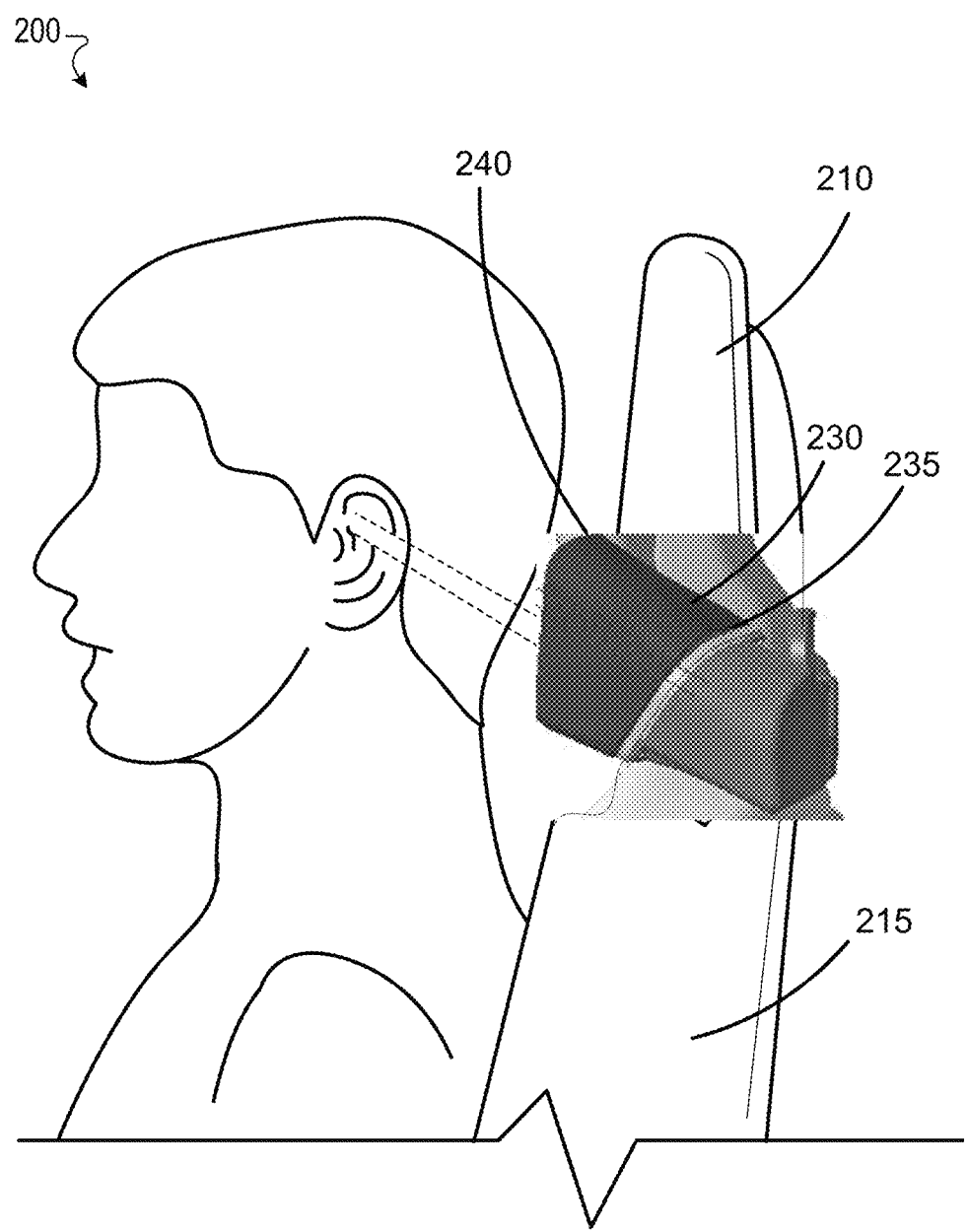
Figure 2D:
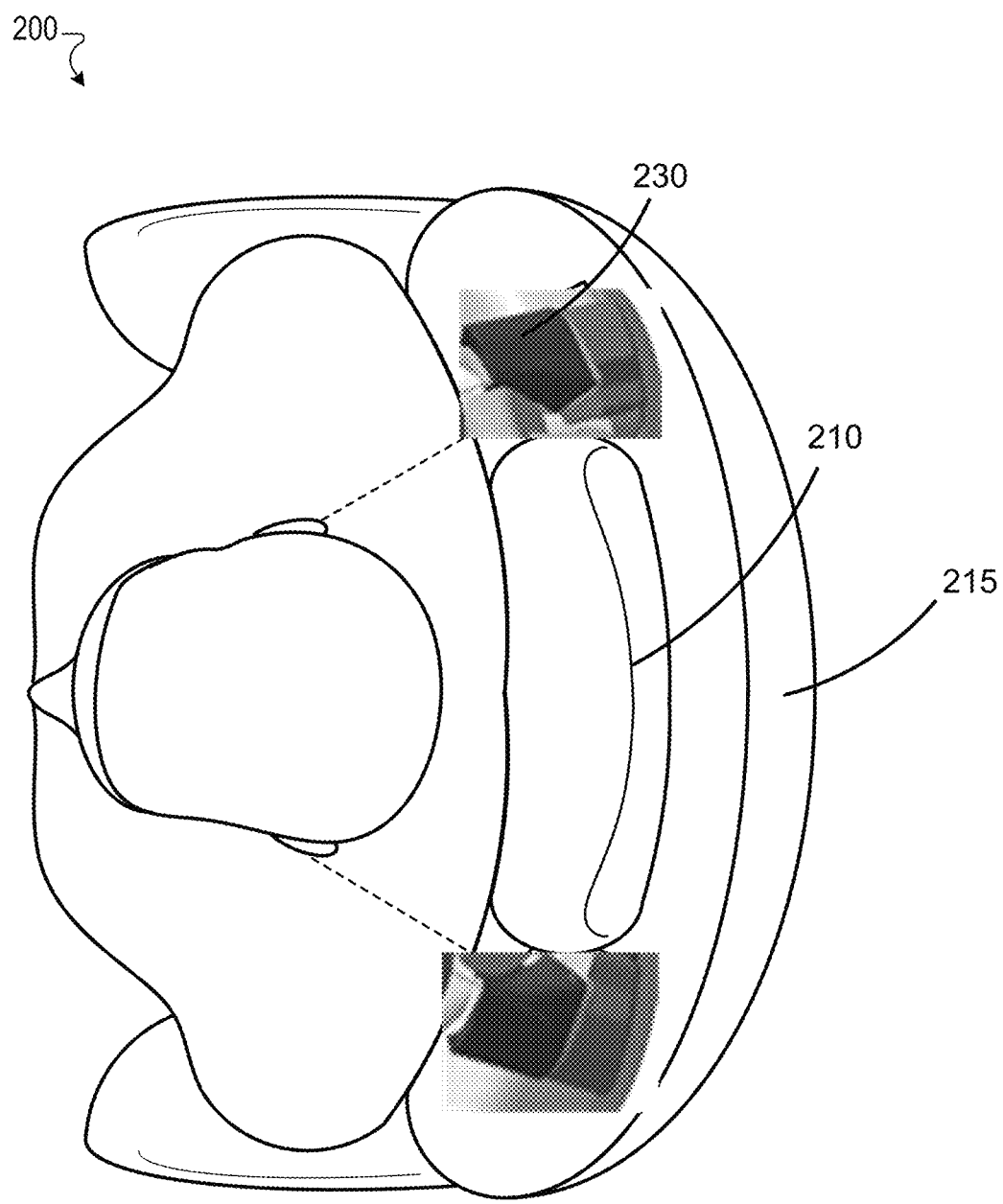

FIGS. 2A-2D show various views of an example implementation of backrest speakers with acoustic channels. Specifically, FIG. 1A shows a front view of a vehicle seat system 200 with an occupant 205 occupying the vehicle seat. FIGS. 2B, 2C, and 2D show the top perspective view, side view, and top view, respectively, of the system 200. The system 200 includes a vehicle seat that has a seat headrest portion 210 and a seat backrest portion 215. The system includes acoustic transducers disposed 220 disposed in the seat backrest portion 215 on either side of the seat headrest portion 210. The system 200 also includes, for each acoustic transducer 220, an acoustic channel 230 configured to convey acoustic energy from the corresponding acoustic transducer 220 to a region proximate to an ear of the occupant 205. The acoustic channel 230 includes a first end 235 that is configured to be fitted around a driver of the acoustic transducer 220, and a second end 240. The second end 240 is on the opposite side of the acoustic channel 230 as compared to the first end 235, and is disposed in a region that is close to the ear of the occupant 205. Acoustic energy from the transducer 220 is radiated out of the acoustic channel 230 through the second end 240. In some implementations, the second end 240 is at a location in space that is closer to the seat headrest portion 210 than the seat backrest portion 215. In some implementations, the second end 240 is disposed at a vertically higher location as compared to the first end 235.

The seat headrest portion 210 can be coupled to the seat backrest portion in various ways. In some implementations, the seat headrest portion is disposed on top of the seat backrest portion in a detachable configuration. For example, the seat headrest portion 210 can be connected to the seat backrest portion 215 via one or more headrest rods or posts. In such cases, the seat headrest portion 210 can be adjusted to various heights with respect to the seat backrest portion 215, for example, by making the headrest rods or posts slide in or out of corresponding receptacles disposed on a top surface of the seat backrest. In some implementations, the seat headrest portion 210 and the seat backrest portion 215 are integrated into a single integrated seat structure. Such an integrated seat structure is often referred to as a "mummy seat," and is often found in high-end vehicles such as sports cars.

The acoustic transducer 220 can be disposed in the seat backrest portion 215 in various ways. The seat backrest portion 215 can include an enclosure for receiving at least a portion of an acoustic transducer 220. In the example shown in FIGS. 2A-2D, at least a portion of the speakers or acoustic transducers are disposed outside the seat backrest portion 215. In such cases, the enclosure can include some portions of the transducer 220 (e.g., the lower portion of the transducer, or connections for the transducer) is disposed, but the driver cone of the transducer is disposed outside of the seat backrest 215. In some implementations, the system 200 can also include a mounting bracket 245 for supporting at least a portion of the acoustic transducer 220.

The position of the acoustic transducer 220 with respect to the seat backrest portion 215 can be configured in various ways. In some implementations, the acoustic transducers 220 are disposed as shoulder speakers, and placed just under the headrest portion 210 (e.g., on a top surface of the backrest portion 215) and on either side of the headrest portion 210. In some implementations, the driver of an acoustic transducer 220 is pointed towards the corresponding ear. For example, the driver can be configured to point upwards between 10 and 40 degrees from the horizontal axis. In some implementations, this may be determined, for example, based on a representative height of an occupant. In some cases, this may result in desirable directionality, and/or inter-seat isolation, and better acoustic performance as compared to, for example, shoulders speakers that radiate acoustic energy vertically upwards. In some implementations, if the acoustic channel is short enough to allow for a line-of-sight between the center of the acoustic transducer 220 and the ear of the occupant 205, the acoustic transducer can be configured to radiate acoustic energy towards the ear of the occupant (or within a predetermined range (e.g., 10 degrees) of it). Is some cases, such angular and positional adjustments of the acoustic transducers (also referred to as articulation of the transducers) can provide satisfactory inter-aural and/or inter-seat isolation and help achieve a target distribution pattern for the acoustic energy emanating from the acoustic transducers 220.

In some implementations, the top of the backrest portion 215 is broader than the headrest portion 210, and as a result the distance between the two acoustic transducers 220 on either side of the headrest is more than the width of the headrest portion 210. When the distance between the acoustic transducers 220 is significant (e.g., about 29 cm in one particular example), the acoustic transducers can be angled inwards (i.e., towards one another). In some cases, this can improve inter-seat isolation, for example, at high frequencies where the transducers 220 become highly directional.

The system 200 includes one or more acoustic channels 230 for carrying acoustic energy from the corresponding acoustic transducer 220 to a region close or proximate to the corresponding ear of the seat occupant 205. In some implementations, the first end 235 of the acoustic channel 230 is fitted around the periphery of the driver of an acoustic transducer 220 in an acoustically sealed configuration such that the acoustic energy radiated by the transducer 220 is substantially contained within the acoustic channel 230 until it is radiated out via the second end 240 of the acoustic channel. As such, the acoustic channel can be designed to carry the acoustic energy from a relatively far-field transducer 220 to a region close to the corresponding ear. Therefore, such an acoustic channel may in some cases improve one or more acoustic characteristics including, for example, directionality and/or isolation characteristics. In some implementations, using such an acoustic channel 230 may provide better passive isolation than comparable headrest speakers.

In some implementations, the acoustic channel 230 can be constructed of a rigid but lightweight material such as expanded (or injection-molded) resin. Other lightweight rigid material that may be used for constructing the wing include, for example, thermoplastic material such as polystyrene, polypropylene, polyethylene, and acrylonitrile butadiene styrene (ABS). In some implementations, rigid, closed-cell resin foam such as expanded polystyrene (EPS) may be used in constructing at least a portion of the acoustic channel 230. In some implementations, the use of EPS may provide improved acoustic isolation. In some implementation, the acoustic channel 230 can be constructed from a thermoplastic material and covered using a foam. Because the acoustic channel is disposed proximate to the headrest portion 210, the material of the acoustic channel can be chosen such that the acoustic channel 230 does not result in any discomfort for an occupant of the seat.

The shape and size of the acoustic channel 230 can be configured in various ways. In some implementations, the acoustic channel 230 can have a generally funnel-shaped or horn-shaped structure where the cross-sectional area of the second end 240 is larger than the cross-sectional area of the first end 235. In some implementations, the cross-sectional area of the first end 235 can be larger than that of the second end 240. In yet other implementations, the acoustic channel may have a substantially uniform cross-section along the length of the channel from the first end to the second end. The length of the acoustic channel can be configured, for example, as a trade-off between an acoustic experience and interference with the comfort of the occupant. For example, if the length of the acoustic channel 230 is large, the channel may be able to deliver acoustic energy to a region close the occupant's ear. However, placing the second end 240 too close to the occupant's ear may cause discomfort for the occupant 205, for example, when the occupant moves his/her head. In addition, longer acoustic channels 230 may also result in higher losses in acoustic energy, for example, due to absorption along the length of the channel. As such, the shape and size of the acoustic channel 230 can be configured in various ways, and based on one or more parameters including, for example, a target radiation pattern, vehicle parameters, desired isolation characteristics, and comfort parameters.

Figure 3:
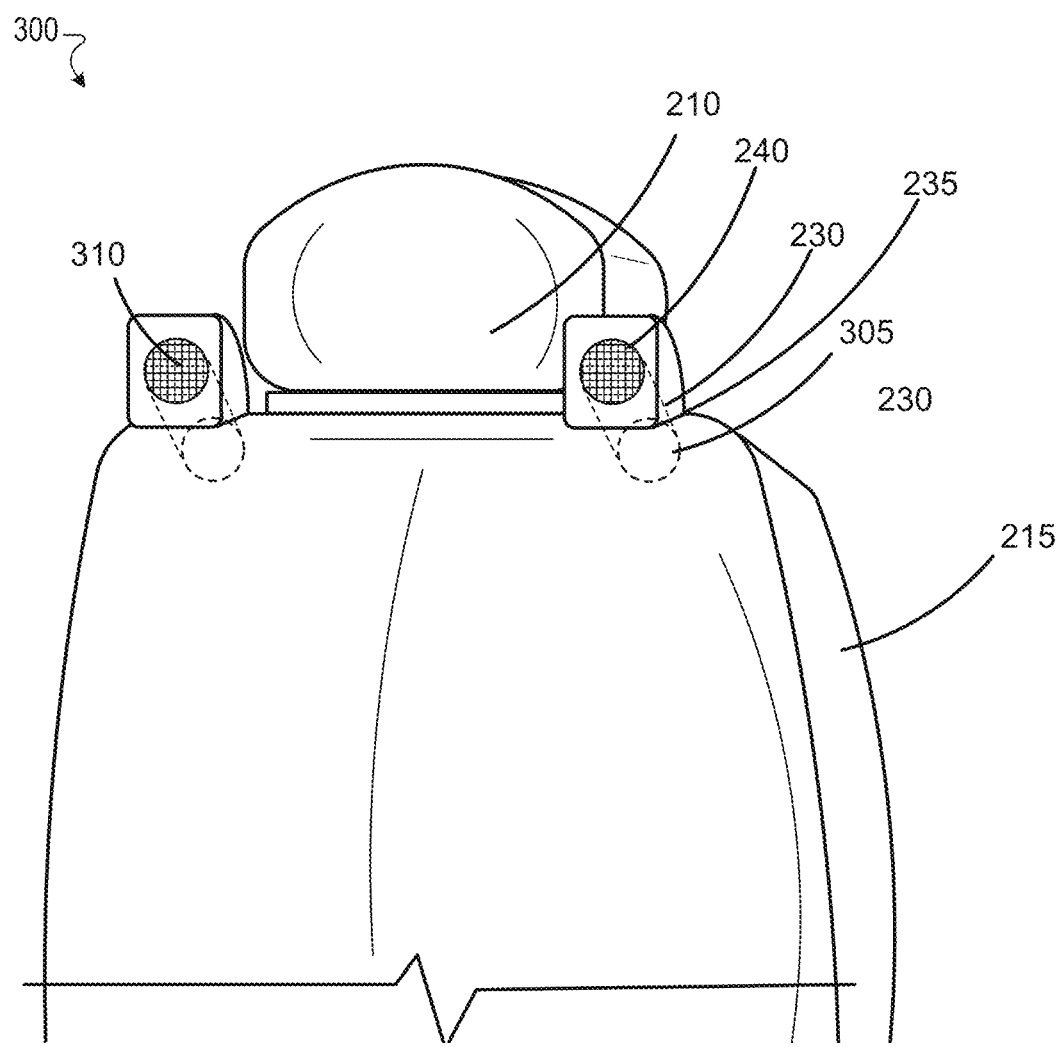
FIG. 3 shows an example implementation where the backrest speakers are enclosed within the backrest.

In the examples shown in FIGS. 2A-2D, at least a portion of the acoustic transducer 220 is disposed outside the backrest. However, the acoustic transducer may also be completely contained within an enclosure of the backrest portion 215. FIG. 3 shows an example implementation of a system 300 where the backrest speakers are enclosed completely within the backrest portion 215. In such cases, an acoustic transducer can be disposed in the seat backrest in a way such that the external end of a driver of the acoustic transducer fits over or near an external opening 305 of the enclosure. In such cases, the acoustic channel 230 can be disposed over the external opening 305 of the enclosure such that the first end 235 of the acoustic channel 230 fits around the external opening 305 in an acoustically sealed configuration. The second end 240 of the acoustic channel 230 can be disposed at a vertically higher location (as compared to the first end 235) such that acoustic energy from the acoustic transducer is radiated through the second end 240 at a location that is close to the ear of the occupant. In some implementations, the external opening 305 of the enclosure is disposed on the exterior surface of the support structure at a location of a support structure (e.g., the backrest portion 215) that is adjacent to a shoulder of an occupant of the vehicle seat.

The acoustic channel 230 can be configured in accordance with various design and aesthetic parameters and/or issues. In some implementations, an acoustically transparent material can be disposed over the second end 240 of the acoustic channel 230, for example, to improve aesthetics. The acoustically transparent material can include, a portion of a speaker grill, or fabric. In some implementations, an outer layer of the vehicle seat (e.g., fabric, suede, artificial leather, or other perforated material) can be disposed over the acoustic channel to enclose at least a portion of the acoustic channel with the headrest portion 210 and/or the backrest portion 215. In some implementations, the external openings (e.g., the second end 240) of an acoustic channel 230 may be positioned and configured in accordance with one or more design considerations, for example, to resemble an air-intake pathway of a sports car. This may be done, for example, to produce a futuristic look for the vehicle seat.

Figure 4:
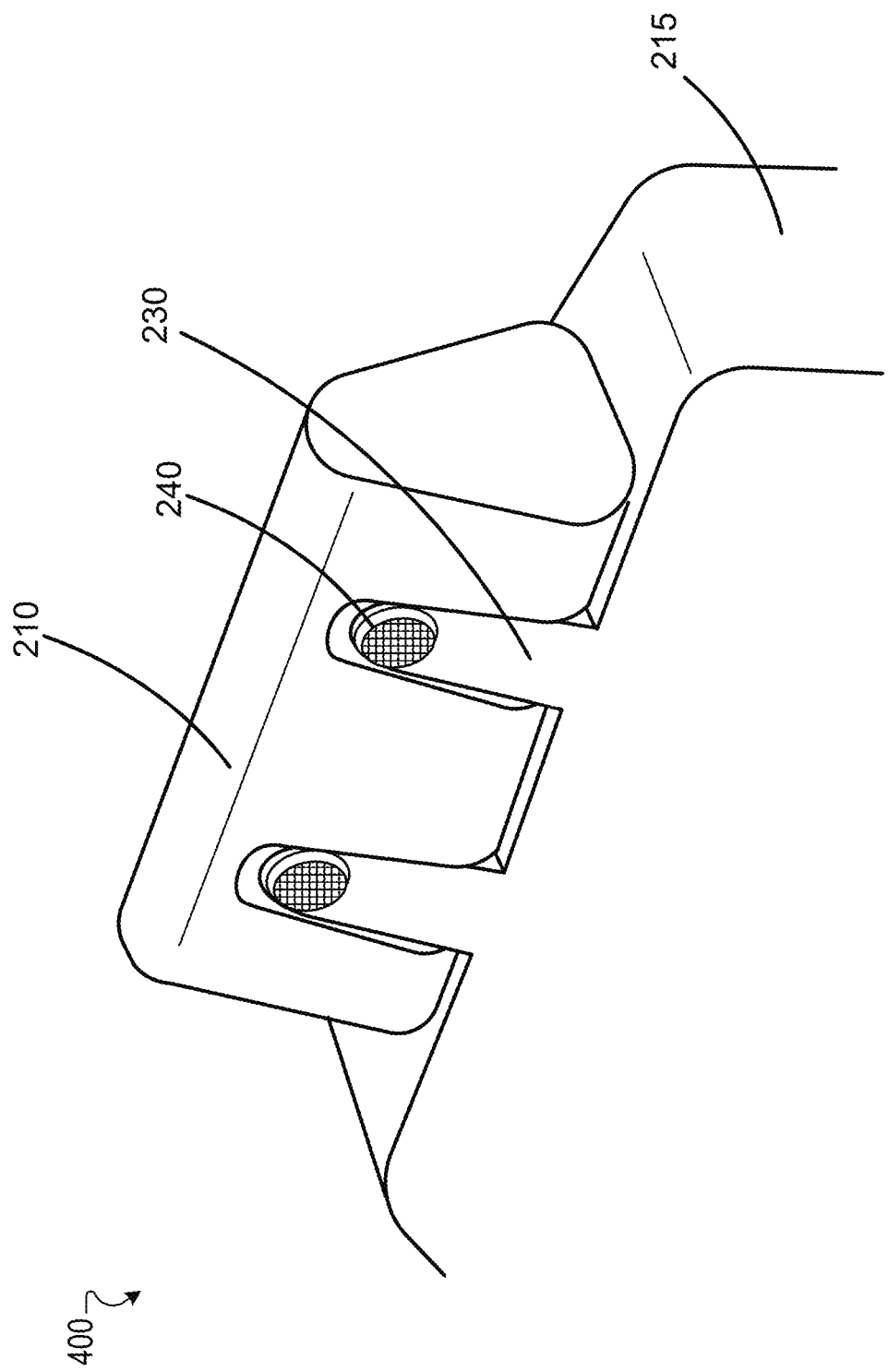
FIG. 4 shows an example implementation where the acoustic channels are disposed in recesses within a seat headrest.

FIG. 4 shows another example implementation 400 where the acoustic channels 230 are disposed in recesses within an adjustable seat headrest 210. Such a configuration allows for the acoustic transducers to be disposed within an enclosure of the backrest portion 215, while positioning the acoustic channels 230 to closely replicate acoustic performance of headrest speakers. In such cases, the acoustic channel 230 can be configured such that the adjustable headrest 210 can slide up and down along the acoustic channel using the recessed portions of the headrest.

In some implementations, one or more parameters (e.g., gain, equalization parameters, etc.) of an acoustic transducer 220 can be adjusted based on the based on the shape and size of the acoustic channels (e.g., to account for changes to transfer functions of associated acoustic paths). In some implementations, this can be done, for example, during a system tuning process by a controller configured to adjust equalizer settings for the acoustic transducer. In some implementations, the adjustments can be made dynamically, for example to account for any changes to acoustic paths through the acoustic channels. The functionality of a controller, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims.

For example, in some implementations, the length of the acoustic channel can be made adjustable. For example, the acoustic channel can include a collapsible structure that expands and contracts to allow the acoustic channel to be moved away from and closer to the ears of an occupant. In some implementations, such a collapsible structure can include one or more telescopic segments that are configured to collapse into one another as the acoustic channel is reduced in size. In some implementations, the acoustic channel can include a spring-like or bellow-like structure that allows a length of the acoustic channel to be made adjustable. Such adjustable acoustic channels can provide additional advantages by allowing the acoustic experience of the occupant to be personalized. The length of the acoustic channel may be adjusted either manually or using an electric motor controllable by the occupant. In some implementations, a controller can be configured to dynamically update one or more equalization parameter of a corresponding transducer in accordance with an adjusted length of the acoustic channel. Such dynamic adjustment of one or more equalization parameter in accordance with adjustable channel length is described in additional details in U.S. application Ser. No. 15/072,925, filed on Mar. 17, 2016, the entire content of which is incorporated herein by reference.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A vehicle seat comprising:
   a seat headrest portion for supporting the head of an occupant;
   a seat backrest portion for supporting the back of the occupant in a seated position, the backrest portion comprising an enclosure for receiving a portion of an acoustic transducer, wherein a driver cone of the acoustic transducer is disposed outside the seat backrest portion; and
   an acoustic channel disposed in front of the acoustic transducer, the acoustic channel having a first end that is configured to be fitted around a front portion of the driver cone of the acoustic transducer in an acoustically sealed configuration, and a second end being opposite the first end and at a vertical height higher than the first end, the second end being disposed closer to an ear of the occupant of the vehicle seat than the first end, wherein the acoustic channel is configured to radiate acoustic energy from the acoustic transducer through the second end.

2. The vehicle seat of claim 1, wherein the seat headrest portion is disposed on top of the seat backrest portion in a detachable configuration.

3. The vehicle seat of claim 1, wherein the seat headrest portion and the seat backrest portion are portions of an integrated structure.

4. The vehicle seat of claim 1, wherein the seat backrest portion includes a top surface, and an external opening of the enclosure extends to the top surface.

5. The vehicle seat of claim 4, wherein the acoustic transducer is disposed within the enclosure in a configuration such that an external end of the acoustic transducer fits over the external opening of the enclosure.

6. The vehicle seat of claim 1, wherein a cross section of the second end of the acoustic channel is larger than a cross section of the first end.

7. The vehicle seat of claim 1, wherein at least one of: i) a shape of the acoustic channel and ii) an articulation of the acoustic transducer is configured in accordance with a target distribution pattern for the acoustic energy radiated by the acoustic transducer.

8. The vehicle seat of claim 7, wherein the target distribution pattern comprises one or more of: i) an inter-aural distribution characteristic, and ii) an inter-seat distribution characteristic.

9. The vehicle seat of claim 1, wherein an outer layer of the vehicle seat is disposed over the acoustic channel to enclose at least a portion of the acoustic channel and the seat backrest.

10. The vehicle seat of claim 1, wherein an outer layer of the vehicle seat is disposed over the acoustic channel to enclose at least a portion of the acoustic channel and the seat headrest.

11. The vehicle seat of claim 1, wherein an acoustically transparent material is disposed over the second end of the acoustic channel.

12. The vehicle seat of claim 11, wherein the acoustically transparent material comprises a portion of a speaker grill.

13. The vehicle seat of claim 1, the acoustic channel having an adjustable length between the first end and the second end.

14. The vehicle seat of claim 13, wherein one or more equalization parameters are dynamically updated in accordance with the adjustable length.

15. The vehicle seat of claim 13, wherein the second end is configured to be disposed around the ear of the occupant of the vehicle seat in a substantially sealing configuration.

16. A vehicle seat comprising:
   a support structure configured to support the back of an occupant in a seated position;
   an enclosure disposed within the support structure, the enclosure having an opening extending to an exterior surface of the support structure, the enclosure configured to receive a portion of an acoustic transducer, wherein a driver cone of the acoustic transducer is disposed outside the support structure configured to support the back of the occupant; and
   an acoustic channel disposed in front of the acoustic transducer, the acoustic channel having a first end configured to be fitted around a front portion of the driver cone of the acoustic transducer in an acoustically sealed configuration, and a second end being opposite the first end, and at a vertical height higher than the first end, the second end being disposed closer to an ear of the occupant of the vehicle seat than the first end, wherein the acoustic channel is configured to radiate acoustic energy through the second end.

17. The vehicle seat of claim 16, wherein the opening extends to the exterior surface of the support structure at a location of the support structure that is adjacent to a shoulder of the occupant of the vehicle seat.

18. The vehicle seat of claim 16, wherein the opening is disposed on the exterior surface of the support structure such that the acoustic transducer disposed within the enclosure radiates acoustic energy towards the ear of the occupant of the vehicle seat.

19. The vehicle seat of claim 16, wherein a cross section of the second end of the acoustic channel is larger than a cross section of the first end.

20. The vehicle seat of claim 16, wherein at least one of: i) a shape of the acoustic channel and ii) an articulation of the acoustic transducer is configured in accordance with a target distribution pattern for the acoustic energy radiated by the acoustic transducer.

21. The vehicle seat of claim 20, wherein the target distribution pattern comprises one or more of: i) an inter-aural distribution characteristic, and ii) an inter-seat distribution characteristic.

22. The vehicle seat of claim 16, wherein an outer layer of the vehicle seat is disposed over the acoustic channel to enclose at least a portion of the acoustic channel together with the support structure.

23. The vehicle seat of claim 16, wherein an acoustically transparent material is disposed over the second end of the acoustic channel.

24. The vehicle seat of claim 23, wherein the acoustically transparent material comprises a portion of a speaker grill.

25. The vehicle seat of claim 16, the acoustic channel having an adjustable length between the first end and the second end.

26. The vehicle seat of claim 25, wherein one or more equalization parameters are dynamically updated in accordance with the adjustable length.

27. The vehicle seat of claim 25, wherein the second end is configured to be disposed around the ear of the occupant of the vehicle seat in a substantially sealing configuration.

* * * * *